United States Patent
Oike et al.

(10) Patent No.: US 7,197,814 B2
(45) Date of Patent: Apr. 3, 2007

(54) METHOD FOR FABRICATING A THIN FILM MAGNETIC HEAD

(75) Inventors: Taro Oike, Chuo-ku (JP); Makoto Yoshida, Chuo-ku (JP); Tetsuo Miyazaki, Chuo-ku (JP); Shin Narushima, Chuo-ku (JP); Hiroyuki Miyamoto, Chuo-ku (JP)

(73) Assignee: TDK Corporation, Tokyo (JP)

( * ) Notice: Subject to any disclaimer, the term of this patent is extended or adjusted under 35 U.S.C. 154(b) by 157 days.

(21) Appl. No.: 11/150,211

(22) Filed: Jun. 13, 2005

(65) Prior Publication Data

US 2005/0229386 A1    Oct. 20, 2005

Related U.S. Application Data

(62) Division of application No. 10/153,682, filed on May 24, 2002, now Pat. No. 6,920,685.

(30) Foreign Application Priority Data

Jun. 4, 2001 (JP) .............................. 2001-167557
Jun. 12, 2001 (JP) .............................. 2001-177134

(51) Int. Cl.
*G11B 5/127* (2006.01)
*C23C 14/00* (2006.01)

(52) U.S. Cl. .............................. 29/603.16; 29/603.09; 29/603.12; 29/603.15; 29/603.17; 29/603.18; 204/192.34

(58) Field of Classification Search ............. 29/603.15, 29/603.16, 603.17, 603.18, 603.09, 603.12; 451/57, 58, 38, 39.2; 204/192.34, 192.35, 204/192.32, 216; 216/87, 66; 360/126, 360/317, 105
See application file for complete search history.

(56) References Cited

U.S. PATENT DOCUMENTS

| 4,945,427 A | * | 7/1990 | Cunningham ................ 360/75 |
| 5,130,875 A | | 7/1992 | Ono et al. |
| 5,243,483 A | | 9/1993 | Ono et al. |
| 5,295,032 A | | 3/1994 | Koga et al. |
| 5,523,539 A | | 6/1996 | Hoogerwerf et al. |
| 5,854,722 A | * | 12/1998 | Cunningham et al. ... 360/77.04 |
| 5,940,250 A | | 8/1999 | McNeil et al. |
| 6,002,540 A | * | 12/1999 | Cunningham et al. ... 360/77.04 |
| 6,094,806 A | * | 8/2000 | McNeil et al. ........... 29/603.14 |
| 6,108,165 A | | 8/2000 | Maruyama et al. |
| 6,163,954 A | | 12/2000 | Nakagawa |
| 6,170,149 B1 | | 1/2001 | Oshiki et al. |
| 6,246,538 B1 | * | 6/2001 | Kasamatsu et al. ...... 360/97.01 |

FOREIGN PATENT DOCUMENTS

| JP | 05-081614 | 4/1993 |
| JP | 11-353618 | 12/1999 |
| JP | 2001-043510 | 2/2001 |
| JP | 2001-084512 | 3/2001 |

* cited by examiner

*Primary Examiner*—A. Dexter Tugbang
*Assistant Examiner*—Tai Van Nguyen
(74) *Attorney, Agent, or Firm*—Oliff & Berridge, PLC

(57) ABSTRACT

A writing magnetic pole portion composed of a first magnetic film and a second magnetic film formed on the first magnetic film via a gap film is fabricated on a given wafer. Then, the writing magnetic pole portion is swung forward and backward around a rotation standard axis parallel to a center line of the writing magnetic pole portion in a direction parallel to a surface of the. Then, the writing magnetic pole portion is milled during the swing of the writing magnetic pole portion to define the width of the writing magnetic pole portion.

14 Claims, 7 Drawing Sheets

METHOD FOR FABRICATING A THIN FILM MAGNETIC HEAD

This is a Division of application Ser. No. 10/153,682 filed May 24, 2002 now U.S. Pat. No. 6,920,685. The entire disclosure of the prior application is hereby incorporated by reference herein in its entirety.

BACKGROUND OF THE INVENTION

1. Field of the Invention

This invention relates to a method for fabricating a thin film magnetic head, and particularly to a method for milling a writing magnetic pole portion of the thin film magnetic head.

2. Related Art Statement

A writing magnetic pole portion of a writing element constituting a thin film magnetic head is fabricated as follows. First of all, a first magnetic film functioning as a bottom magnetic layer of the writing element is formed and then, a second magnetic film functioning as a top magnetic layer of the writing element is formed by means of a frame-plating method. Then, the thus obtained multilayered structure is ion-milled, to fabricate the writing magnetic pole portion.

FIGS. 1 and 2 an elevational views showing a thin film magnetic head fabricated on a wafer as is viewed from the air bearing surface (ABS). FIG. 3 is a cross sectional view of the thin film magnetic head illustrated in FIG. 1, taken on line A—A. The above ion-milling process includes an ion-milling process in the depth direction and an ion-milling process in the width direction. In the ion-milling process of depth direction, as shown in FIG. 1, the first magnetic film 1 is dry-etched in the depth direction D by utilizing the second magnetic film 3 as a mask so that the width of the portion 1A of the first magnetic film 1 opposite to the second magnetic film 3 is set equal to the width of the second magnetic film 3. In the ion-milling process of width direction, the first magnetic film 1 and the second magnetic film 3 are dry-etched in the width direction W and thus, reduced in width, to define the width of the writing magnetic pole portion 10.

A MR element 65 is formed below the first magnetic film 1 and above a base 61 made of AlTiC via a base underlayer 62 and a bottom shielding film 63. Reference numeral "2" designates a gap layer and reference numeral "67" designates a coil film which is embedded in an insulating film 66.

FIG. 4 is an enlarged view showing a portion of a wafer where thin film magnetic heads are fabricated. In FIG. 4, attention is paid to one of the thin film magnetic heads. The above-mentioned ion-milling of depth direction and of width direction are performed by irradiating ion beam 5 at a given angle on the wafer with rotating the wafer continuously around the center O of the wafer in the direction parallel to the wafer surface. Hereinafter, the rotation may be called as "dynamic rotation". In addition, the width of the writing magnetic pole portion is set to 0.6 µm or below, recently.

In this case, the width of the writing magnetic pole portion 10 may be changed in the direction parallel to the Throat Height (TH) due to shadow effect which is originated from the steps of the second magnetic film 3 and the insulating layer 6. Therefore, the widths of the writing magnetic pole portions may be changed on every wafer and even on the same wafer. As a result, the yield ratio in fabrication of the thin film magnetic film may be decreased.

The fluctuation in width of the writing magnetic pole portions becomes remarkable at the forefronts of the magnetic pole portions, so that the absolute sizes of the magnetic pole portions are largely fluctuated if the Throat Height (TH) length of the magnetic pole portion is set to 0.5 µm or below. In this case, therefore, the yield ratio in fabrication of the thin film magnetic head may be much decreased.

SUMMARY OF THE INVENTION

It is an object of the present invention to provide a method for fabricating a thin film magnetic head where a trim-shaped writing magnetic pole portion is ion-milled so that the width of the magnetic pole portion is defined uniformly in the TH direction.

For achieving the above objects, this invention relates to a method for fabricating a thin film magnetic head (first fabricating method) including a writing magnetic pole portion composed of a first magnetic film and a second magnetic film formed on said first magnetic film via a gap layer, comprising the steps of:

fabricating said writing magnetic pole portion on a given wafer, swing said writing magnetic pole portion forward and backward around a rotation standard axis parallel to a center line of said writing magnetic pole portion in a direction parallel to a surface of said wafer, and milling said writing magnetic pole portion during the swing of said writing magnetic pole portion to define the width of said writing magnetic pole portion.

Also, this invention relates to a method for fabricating a thin film magnetic head (second fabricating method) including a writing magnetic pole portion composed of a first magnetic film and a second magnetic film formed on said first magnetic film via a gap layer, comprising the steps of:

fabricating said writing magnetic pole portion on a given wafer, holding said writing magnetic pole portion for a given period of time forward and backward from a rotation standard axis parallel to a center line of said writing magnetic pole portion in a direction parallel to a surface of said wafer, and milling said writing magnetic pole portion during the holding of said writing magnetic pole portion to define the width of said writing magnetic pole portion.

BRIEF DESCRIPTION OF THE DRAWINGS

For a better understanding of this invention, reference is made to the attached drawings, wherein.

DETAILED DESCRIPTION OF PREFERRED EMBODIMENTS

This invention will be described in detail, with reference to the drawings, hereinafter. The inventors had intensely studied to solve the above problem, and then, found out that the fluctuation in width of the writing magnetic pole portion on the Throat Height (TH) direction, that is, the shadow effect is originated from the dynamic rotation in ion-milling. Therefore, the inventors conceived two new fabricating methods as mentioned above in place of the conventional fabricating method utilizing the dynamic rotation.

Figure 5:
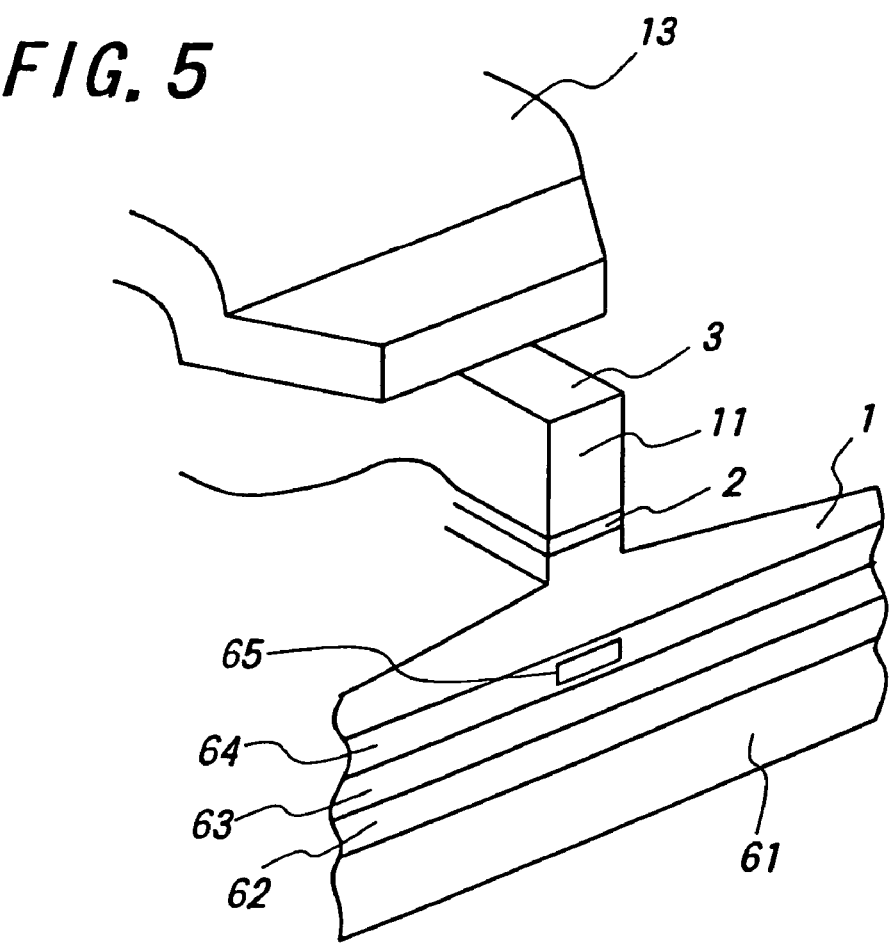
FIG. 5 is a perspective view illustrating a writing magnetic pole portion 10 of a writing element of a thin film magnetic head.

FIGS. 5–10 are conceptual views explaining the first fabricating method and the second fabricating method of the present invention. In this case, attention is paid to one thin film magnetic head on a wafer. FIG. 5 is a perspective view illustrating a writing magnetic pole portion 10 of a writing element of a thin film magnetic head. Reference numeral "1" designates a first magnetic film, and reference numeral "2" designates a gap layer, and reference numeral "3" designates a second magnetic film. The second thin film 3 functions as a pole portion magnetic layer including a base surface 11 to constitute the ABS of the thin film magnetic head. Reference numeral "13" designates a yoke portion magnetic layer which is formed on the second magnetic film 3. Then, a coil layer (not shown) is disposed between the first magnetic film 1 and the yoke portion magnetic layer B. An MR element 65 is formed below the first magnetic film 1 and above a base 61 made of AlTiC via a base underlayer 62 and a bottom shielding film 63 so as to be embedded in an insulating layer 64.

Figure 6:
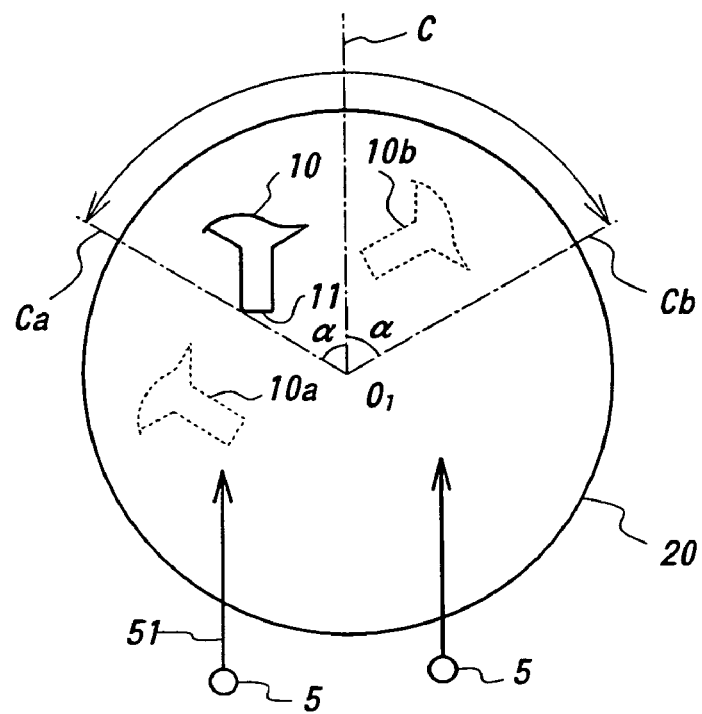
FIG. 6 is a plan view showing a first embodiment of a first fabricating method according to the present invention.

In the first fabricating method of the present invention, as shown in FIG. 6, a wafer on which the thin film magnetic head is formed is swung forward and backward at least one time in the direction parallel to the wafer surface, as shown by the arc-shaped arrow. At the same time, ion beam 5 is irradiated to the thin film magnetic head at a given angle for the wafer surface, to ion-mill the writing magnetic pole portion 10. The angle of the ion beam 5 may be varied in the ion-milling process.

Figure 9:
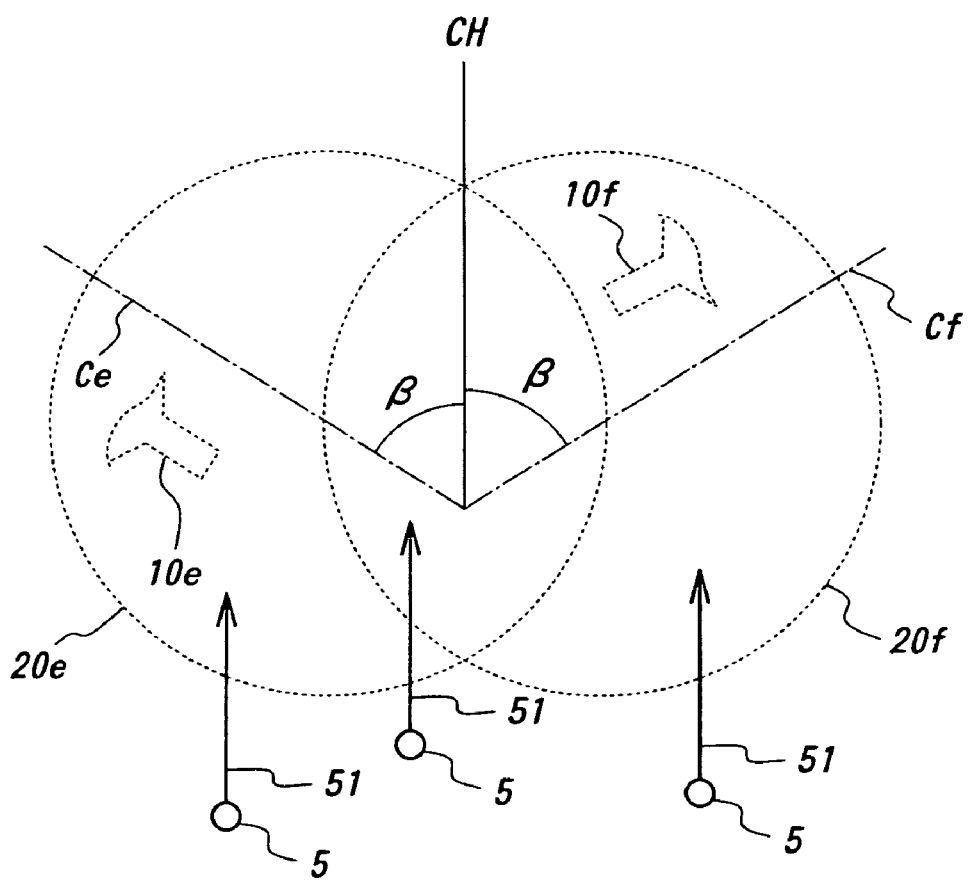
FIG. 9 is an explanatory view showing a second fabricating method according to the present invention.

In the second fabricating method of the present invention, as shown in FIG. 9, a wafer on which the thin film magnetic head is formed is held forward or backward from the original position at a given angle in the area parallel to the wafer surface for a given period of time. In this case, the ion-beam 5 is irradiated to the thin film magnetic head at a given angle for the rotation standard axis "CH".

According to the present invention, instead of the conventional dynamic rotation, the writing magnetic pole portion is swung or held so that the ion beam is irradiated at the thin film magnetic head at a given angle for rotation standard axis for a given period of time the during the milling process. Therefore, the width of the writing magnetic pole portion can be defined uniformly in the Throat Height (TH) direction, so that the yielding ratio in manufacturing thin film magnetic head can be developed.

In a preferred embodiment of the present invention, the first fabricating method and the second fabricating method may be combined. In the case, the width of the writing magnetic pole portion can be defined more uniformly in the Throat Height (TH) direction.

In another preferred embodiment of the present invention, the first fabricating method or the second fabricating method may be combined with the conventional dynamic rotation. This invention will be described in detail hereinafter.

Figure 7:
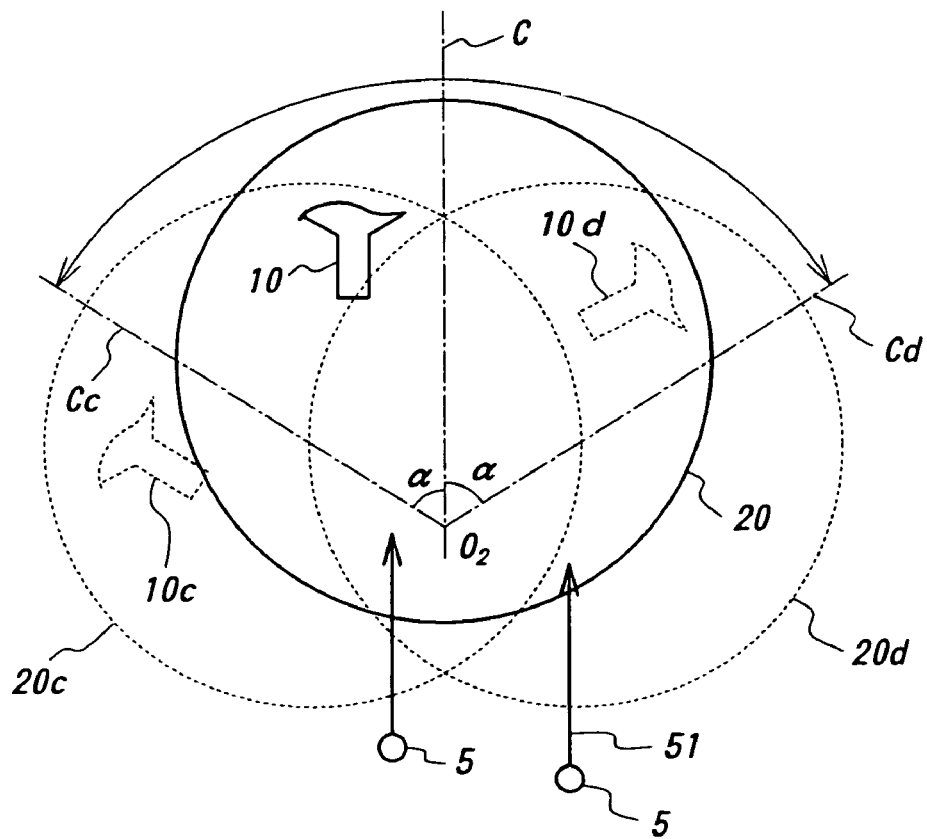
FIG. 7 is a plan view showing a second embodiment of the first fabricating method according to the present invention.
Figure 8:
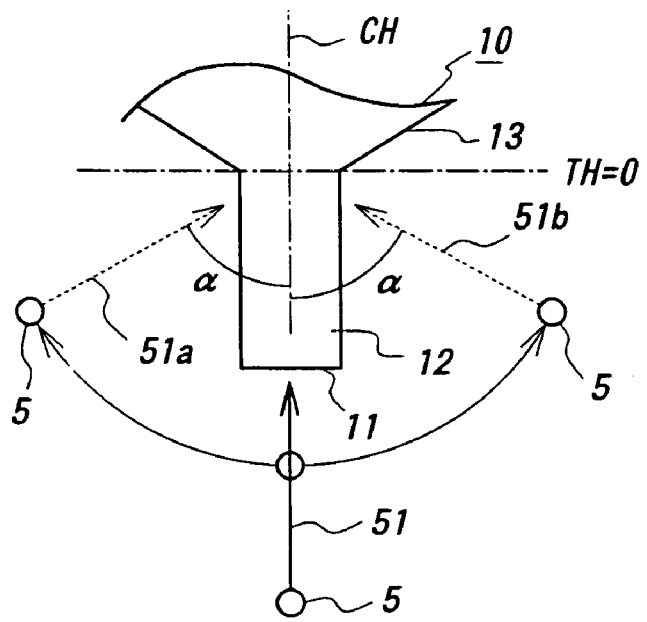
FIG. 8 is a plan view showing a portion of the writing magnetic pole portion of the thin film magnetic head shown in FIGS. 6 and 7, where relative irradiation direction for the writing magnetic pole portion is shown.

As shown in FIGS. 6–8, in the first fabricating method, it is required that the writing magnetic pole portion is swung. Only if the object of the present invention is achieved, the swing angle and the swing velocity are not restricted.

FIG. 6 relates to a first embodiment of the first fabricating method of the present invention, and shows schematically one thin film magnetic head to be fabricated on a wafer in enlargement. Reference numeral "10" designates a writing magnetic pole portion of a thin film magnetic head which is fabricated in a wafer 20. The solid line shows a first state where the base surface 11 of the writing magnetic pole portion 10 which constitutes an ABS later is directed at the irradiation direction 51 of an ion-beam 5. Then, the writing magnetic pole portion 10 is swung around the center $O_1$ of the wafer 20 by a given angle of $\alpha$ forward and backward from the rotation standard axis C in the arc-shaped arrow directions. The angle $\alpha$ corresponds to a stage angle in a X-Y plane including the wafer 20.

The broken line 10a shows a second state where the writing magnetic pole portion 10 is swung forward by the rotation angle of $\alpha$ when the rotation standard axis C is rotated to a position Ca depicted by the dashed line. The broken line 10b shows a third state where the writing magnetic pole portion 10 is swung backward by the rotation angle of $\alpha$ when the rotation standard axis C is rotated to a position Cb depicted by the dashed line.

The ion-milling process may be performed for the first state or another state, but it is desired that the writing magnetic pole portion 10 is swung forward and backward at least one time during the ion-milling process. In this case, the ion beam 5 is always irradiated onto the writing magnetic pole portion 10. In this embodiment, since the writing magnetic pole portion 10 is rotated around the center $O_1$ of the wafer 20, the fluctuation in rotation of the pole portion 10 can be reduced and the rotation in small area of the pole portion 10 can be realized.

FIG. 7 relates to a second embodiment of the first fabricating method of the present invention, and shows schematically one thin film magnetic head to be fabricated on a wafer in enlargement. Reference numeral "10" designates a writing magnetic pole portion of a thin film magnetic head which is fabricated in a wafer 20. The solid line shows a first state where the base surface 11 of the writing magnetic pole portion 10 which constitutes an ABS later is directed at the irradiation direction 51 of an ion-beam 5. Then, the writing magnetic pole portion 10 is swung around a point $O_2$ different from the center $O_1$ of the wafer 20 by a given angle of α forward and backward from the rotation standard axis C in the arc-shaped arrow directions.

The broken line 10c shows a second state where the writing magnetic pole portion 10 is swung forward by the rotation angle of α when the rotation standard axis C is rotated to a position Cc depicted by the dashed line. In this case, the wafer 20 is positioned at 20C. The broken line 10d shows a third state where the writing magnetic pole portion 10 is swung backward by the rotation angle of α when the rotation standard axis C is rotated to a position Cd depicted by the dashed line. In this case, the wafer 20 is positioned at 20d.

The ion-milling process may be performed for the first state or another state as in the above-mentioned first embodiment, but it is desired that the writing magnetic pole portion 10 is swung forward and backward at least one time during the ion-milling process. In this case, the ion beam 5 is always irradiated onto the writing magnetic pole portion 10. The point $O_2$ may be set on the wafer 20 as mentioned in this embodiment, but may set on a given area beyond the wafer 20. In the latter case, the ion-milling process can be performed for plural wafers simultaneously and effectively.

FIG. 8 shows the relative irradiation direction of the ion beam 5 as is viewed from the top of the writing magnetic pole portion 10. The solid line shows an irradiation direction 51 when the writing magnetic pole portion 10 is positioned at the first state as shown in FIGS. 6 and 7. In this case, the ion beam 5 is irradiated onto the base surface 11 of the writing magnetic pole portion 10.

The dashed line 51a shows an irradiation direction when the writing magnetic pole portion 10 is positioned at the second states as shown in FIGS. 6 and 7, respectively. In this case, the ion beam 5 is irradiated onto the writing magnetic pole portion 10 at an angle of α from the center line CH in the direction parallel to the wafer surface. The dashed line 51b shows an irradiation direction when the writing magnetic pole portion 10 is positioned at the third states as shown in FIGS. 6 and 7, respectively. In this case, too, the ion beam 5 is irradiated onto the writing magnetic pole portion 10 at an angle of α from the center line CH in the direction parallel to the wafer surface. In the above first and second embodiments, the relative irradiation direction of the ion beam 5 is varied continuously within the region between the irradiation directions 51a and 51b during the ion-milling process.

In the first and the second embodiments, the rotation angle α is preferably set within 10–135 degrees. In this case, the writing magnetic pole portion 10 can be formed uniformly in trim-like shape.

As mentioned above, the writing magnetic pole portion 10 is swung forward and backward at least one time, but preferably 5–20 times during the ion-milling process.

Figure 1:
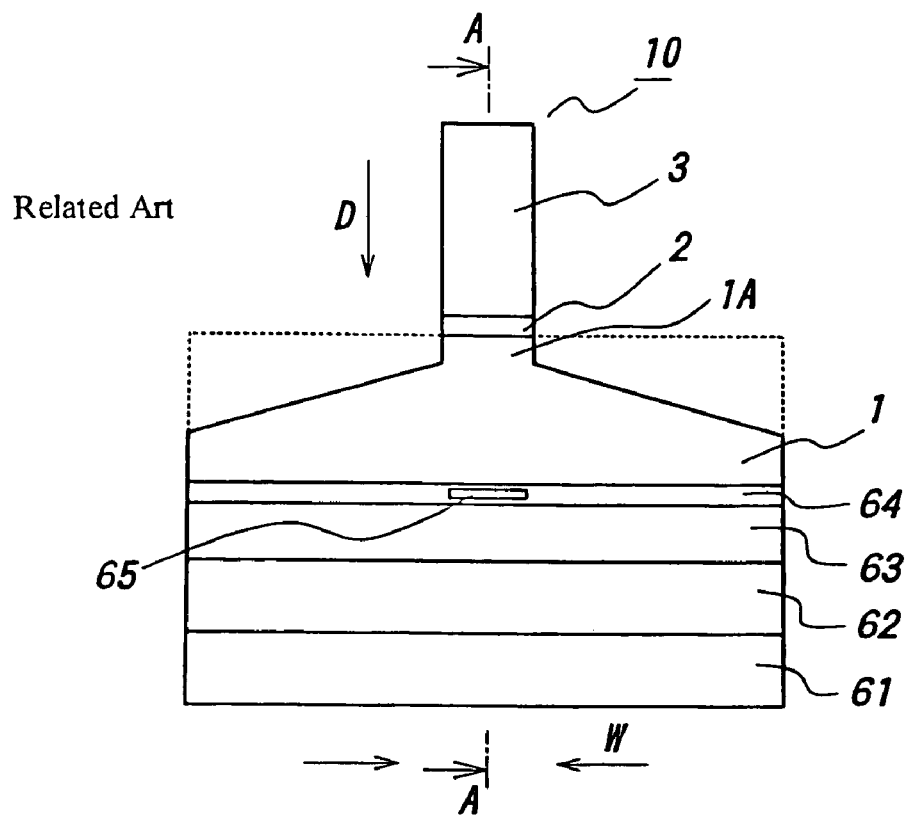
FIG. 1 is a schematic view showing ion-milling of depth direction.
Figure 2:
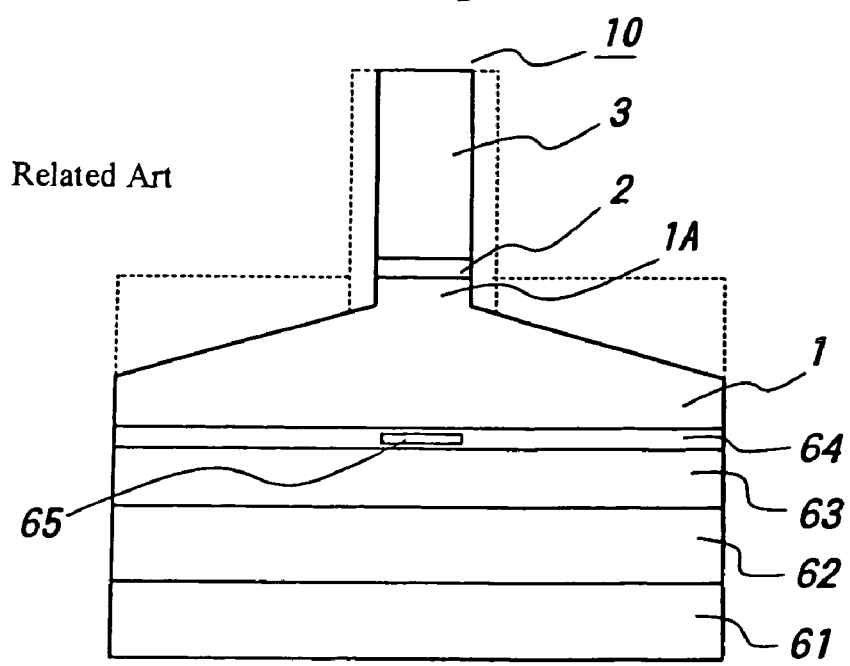
FIG. 2 is a schematic view showing ion-milling of width direction.
Figure 3:
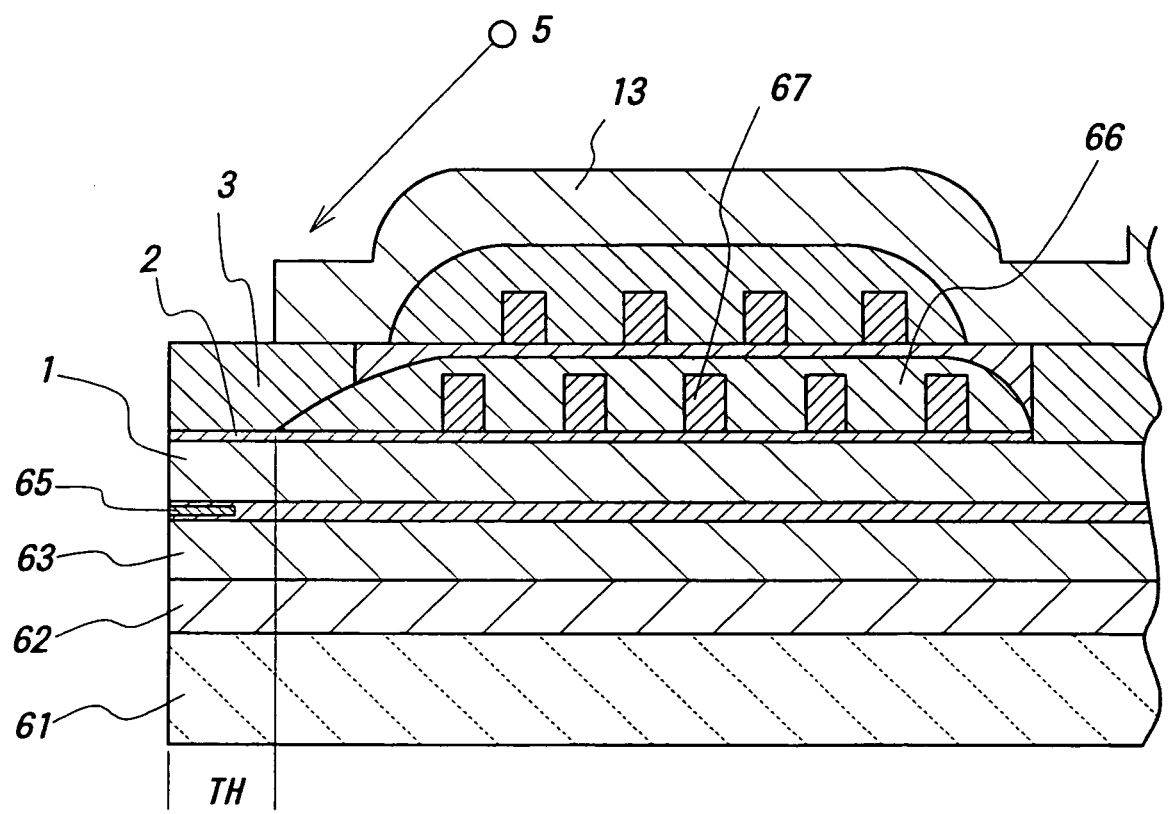
FIG. 3 is a schematic view showing shadow effect in ion-milling.
Figure 4:
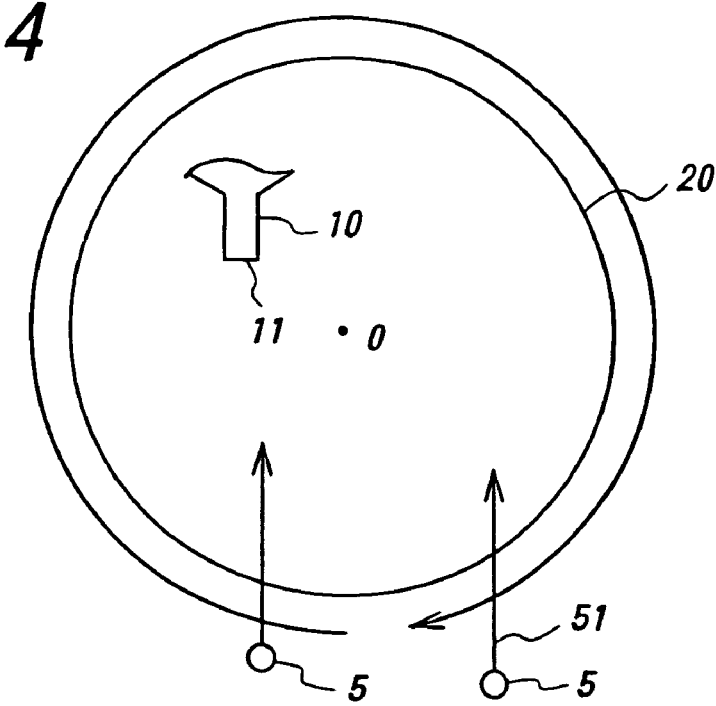
FIG. 4 is an enlarged view showing one thin film magnetic head on a wafer.

The first fabricating method may be performed in the whole ion-milling process for the writing magnetic pole portion 10, but preferably in the ion-milling process of depth direction as shown in FIG. 1.

In this case, it is desired that the ion-milling process is performed by combining the conventional dynamic rotation. As a result, the width of the writing magnetic pole portion 10 can be defined uniformly in the Throat Height (TH) direction in a shorter period of time. In the dynamic rotation, the writing magnetic pole portion is preferably rotated at least one time around the base point.

In the first fabricating method, the relative angle of the ion beam 5 for the wafer surface may be changed during the ion-beam milling process. In this case, the width and depth of the writing magnetic pole portion 10 can be defined easily to be formed in trim-like shape.

Figure 10:
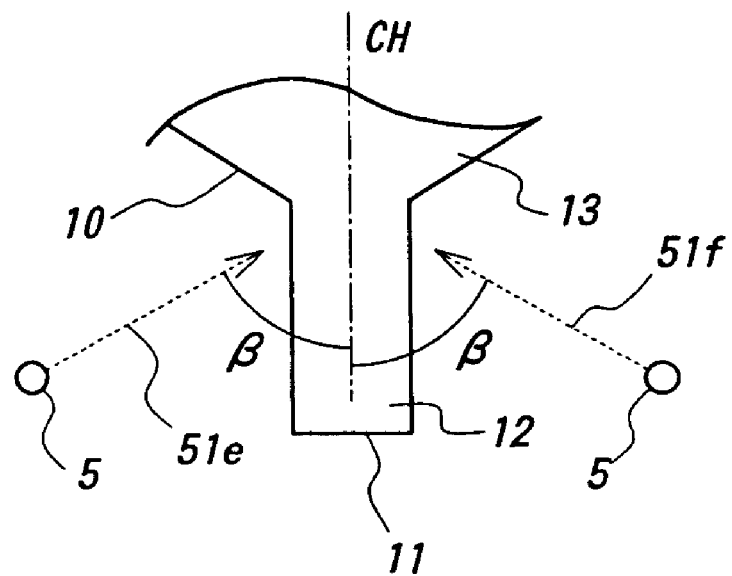
FIG. 10 is a plan view showing a portion of the writing magnetic pole portion of the thin film magnetic head shown in FIG. 9, where relative irradiation direction for the writing magnetic pole portion is shown.

As shown in FIGS. 9 and 10, in the second fabricating method, the writing magnetic pole portion 10 is held forward and backward from the center line CH in the direction parallel to the wafer surface. Only if the object of the present invention can be achieved, the movement angle and the movement velocity of the writing magnetic pole portion is not restricted.

FIG. 9 shows a wafer state in the second fabricating method. The dashed line 10e shows the state where the writing magnetic pole portion 10 is held forward at an angle of β from the center line CH. In this case, the wafer is positioned at 20e. The dashed line 10f shows the state where the writing magnetic pole portion 10 is held backward at an angle of β from the center line CH. In this case, the wafer is positioned at 20f. The angle β corresponds to a stage angle of a X-Y plane including the wafer surface. Herein, reference numerals "5" and "51" designate an ion beam and an irradiation direction of the ion beam. For simplification, the writing magnetic pole portion 10 is held at the two positions as mentioned above, but may be held at three or more positions. The positions 20e may be corresponded to the position 20f.

FIG. 10 shows the relative irradiation direction of the ion beam 5 as is viewed from the top of the writing magnetic pole portion 10. The dashed line 51e shows an irradiation direction when the writing magnetic pole portion 10 is held at the state 10e. In this case, the ion beam 5 is irradiated onto the writing magnetic pole portion 10 forward at an angle of β from the center line CH in the direction parallel to the wafer surface. The dashed line 51f shows an irradiation direction when the writing magnetic pole portion 10 is held at the state 10f. In this case, too, the ion beam 5 is irradiated onto the writing magnetic pole portion 10 backward at an angle of β from the center line CH in the direction parallel to the wafer surface. In the second fabricating method, the ion beam 5 is irradiated onto the writing magnetic pole portion 10 at the states 10e and 10f for a given period of time.

In the second fabricating method, the angle β is preferably set to 90 degrees or below. In this case, the width of the writing magnetic pole portion 10 can be defined more uniformly in the Throat Height (TH) direction. The writing magnetic pole portion 10 may be held at the states 10e and 10f at least one time, but preferably 4–10 times. The holding period of time at each state is preferably set within 15 seconds to 5 minutes.

The second fabricating method may be performed in the whole ion-milling process for the writing magnetic pole portion 10, but preferably in the ion-milling process of depth direction as shown in FIG. 1.

In this case, it is desired that the ion-milling process is performed by combining the conventional dynamic rotation. As a result, the width of the writing magnetic pole portion 10 can be defined uniformly in the Throat Height (TH) direction in a shorter period of time. In the dynamic rotation, the writing magnetic pole portion is preferably rotated at least one time around the base point.

The first fabricating method and the second fabricating method may be performed independently, but may be combined. In the combination, the order is not restricted. In this case, the width of the writing magnetic pole portion can be defined more uniformly in the Throat Height (TH) direction. In this case, it is desired that the rotation angle α is set to 135 degrees or below and the angle β is set to 90 degrees or below. If the rotation angle α is beyond 135 degrees or the angle β is beyond 90 degrees, the shadow effect may occur conspicuously, and thus, the width of the writing magnetic pole portion may not be defined uniformly in the Throat Height (TH) direction. And if the rotation angle α is set to less than 10 degrees, the flare point of the volume portion of the writing magnetic pole portion is receded largely.

In the combination of the first fabricating method and the second fabricating method, at least one method is preferably performed in the ion-milling process of depth direction as shown in FIG. 1. Moreover, the ion-milling process of width direction is preferably performed by utilizing the dynamic rotation.

Instead of the ion-milling process as mentioned above, another milling process, e.g., reactive ion etching (RIE) may be employed.

Figure 11:
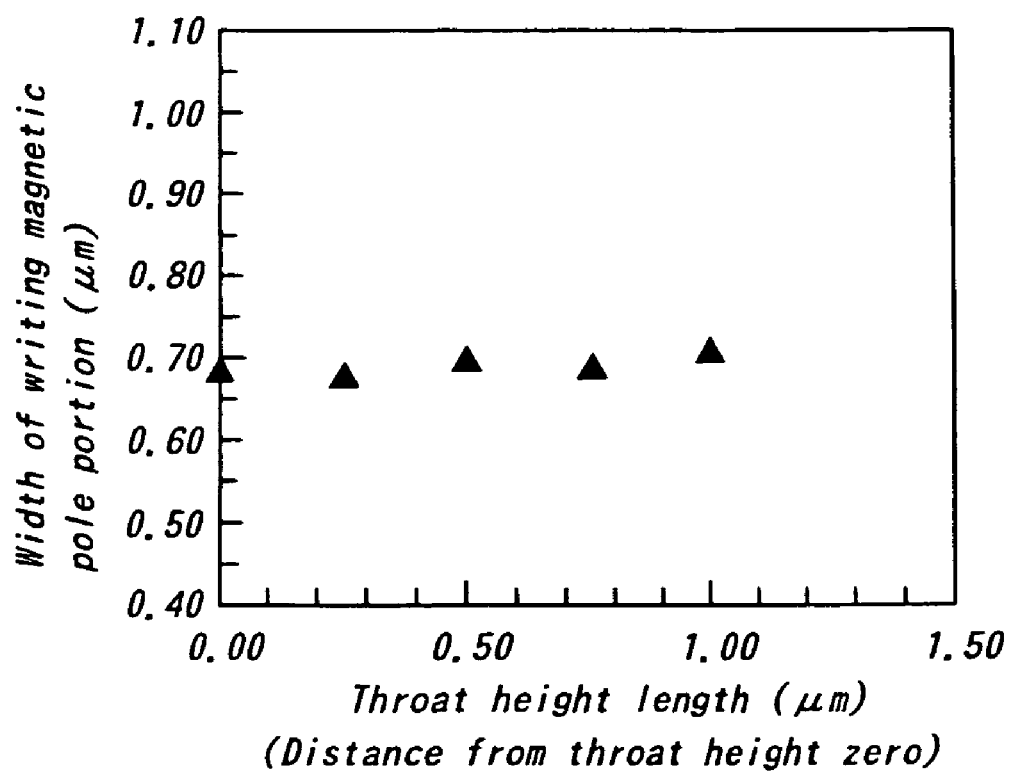
FIG. 11 is a graph showing the dependence of the width of the writing magnetic pole portion which is ion-milled according to the first fabricating method of the present invention on the Throat Height length (distance from Throat Height "0")
Figure 12:
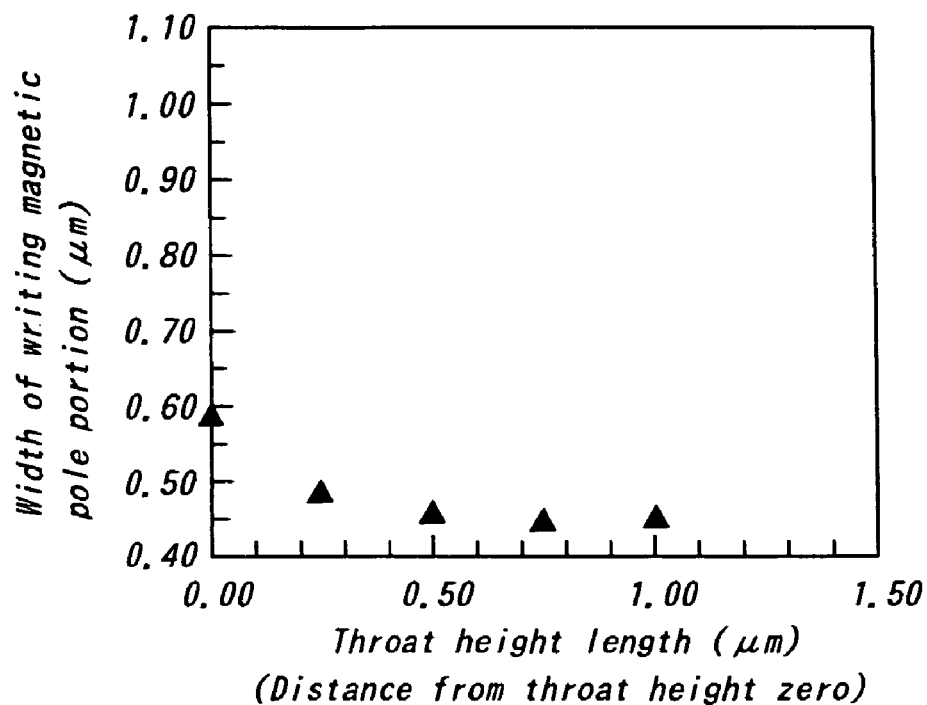
FIG. 12 is a graph showing the dependence of the width of a writing magnetic pole portion which is ion-milled according to a conventional fabricating method on the Throat Height length (distance from Throat Height "0")

FIG. 11 is a graph showing the dependence of the width of the writing magnetic pole portion which is ion-milled according to the first fabricating method of the present invention on the Throat Height (TH) direction. FIG. 12 is a graph showing the dependence of the width of a writing magnetic pole portion which is ion-milled according to a conventional fabricating method on the Throat Height (TH) direction.

As is apparent from FIGS. 11 and 12, the width of the writing magnetic pole portion is defined uniformly as about 0.7 μm over a Throat Height (TH) length (distance from the Throat Height zero) of about 1 μm. The uniformity in width of the writing magnetic pole portion is maintained up to a depth of about 0.5 μm in the trim-like shape.

In a preferred embodiment, the width of the writing magnetic pole portion is monitored before the ion-milling process, and then, is ion-milled on the monitoring information. In this case, for example, the width of the second magnetic film formed on the first magnetic film via the gap film is monitored by utilizing a scanning electron microscope (SEM). The thus obtained monitored data are stored and calculated in a computer to output the monitoring information. Then, the cutting degree in width of the writing magnetic pole portion is determined on the monitoring information. In this case, the uniformity in width of the writing magnetic pole portion can be more developed. Therefore, the yielding ratio in manufacturing thin film magnetic head can be more enhanced.

In defining the width of the writing magnetic pole portion, the monitoring process may be carried out one time or plural times. In the monitoring process of plural times, the width of the writing magnetic pole portion is checked plural times during the ion-milling process. That is, the ion-milling process is carried out for the writing magnetic pole portion on a first monitoring information and the width of the writing magnetic pole portion is monitored again. Then, the subsequent ion-milling process is carried out for the writing magnetic pole portion on a second monitoring information. The ion-milling process and the monitoring process are repeated alternately. Therefore, the width of the writing magnetic pole portion can be defined more uniformly.

Figure 13:
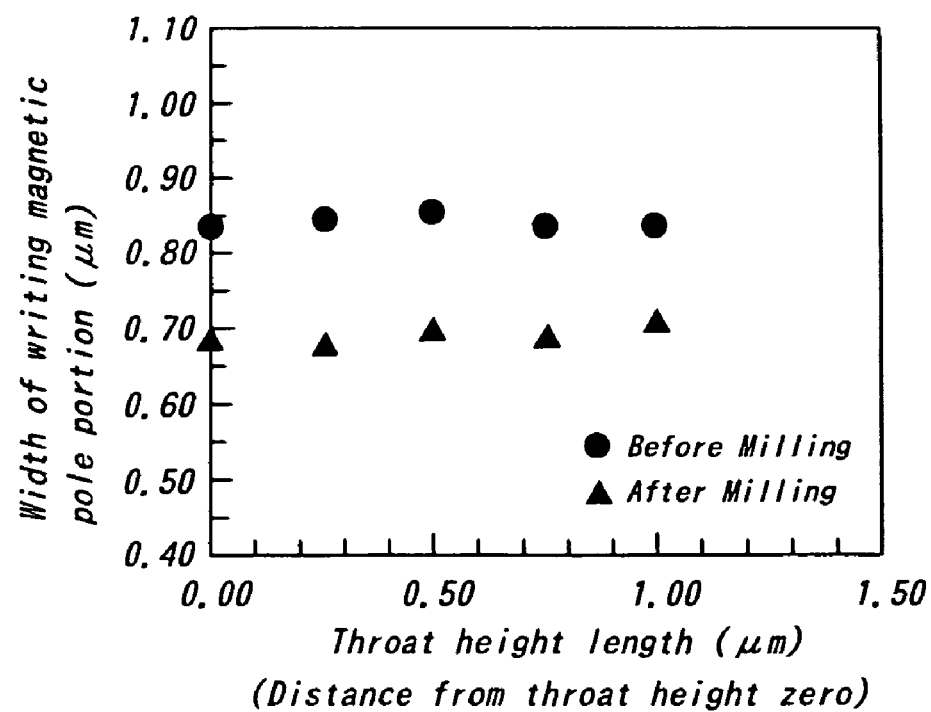
FIG. 13 is a graph showing the dependence of the width of the writing magnetic pole portion which is ion-milled according to the second fabricating method of the present invention on the Throat Height length (distance from Throat Height "0").

FIG. 13 is a graph showing the dependence of the width of the writing magnetic pole portion on the Throat Height (TH) direction in this preferred embodiment. The ion-milling process is performed by the second fabricating method of the present invention. The width of the writing magnetic pole portion is almost uniform over the Throat Height (TH) direction before and after the ion-milling process except that the width of the writing magnetic pole portion after the ion-milling process is reduced than the one before the ion-milling process by a given degree. That is, the uniformity in width of the writing magnetic pole portion can be more enhanced in this preferred embodiment.

Although the present invention was described in detail with reference to the above examples, this invention is not limited to the above disclosure and every kind of variation and modification may be made without departing from the scope of the present invention.

As mentioned above, a method for fabricating a thin film magnetic head where a trim-shaped writing magnetic pole portion is ion-milled so that the width of the magnetic pole portion is defined uniformly in the Throat Height (TH) direction can be provided. As a result, the yielding ratio in manufacturing thin film magnetic head can be more enhanced.

What is claimed is:

1. A method for fabricating a thin film magnetic head including a writing magnetic pole portion composed of a first magnetic film and a second magnetic film formed on said first magnetic film via a gap layer, comprising the steps of:
    fabricating said writing magnetic pole portion on a given wafer,
    holding said writing magnetic pole portion for a given period of time forward and backward from a rotation standard axis parallel to a center line of said writing magnetic pole portion in a direction parallel to a surface of said wafer,
    rotating said writing magnetic pole portion continuously in one direction around said rotation standard axis in said direction parallel to said surface of said wafer, and
    milling said writing magnetic pole portion during the holding and the rotation of said writing magnetic pole portion to define the width of said writing magnetic pole portion.

2. A fabricating method as defined in claim 1, wherein the milling process during the holding of said writing magnetic pole portion is performed in an ion-milling process of depth direction where the width of said first magnetic film corresponds to the width of said second magnetic film by utilizing said second magnetic film as a mask.

3. A fabricating method as defined in claim 1, wherein the holding angle is set to 90 degrees or below forward and backward from said rotation standard axis.

4. A fabricating method as defined in claim 1, wherein the milling process during the rotation of said writing magnetic pole portion is performed in an ion-milling process of width direction where the width of said writing magnetic pole portion is reduced.

5. A fabricating method as defined in claim 1, further comprising the step of monitoring the width of said writing magnetic pole portion, wherein said writing magnetic pole portion is milled on the monitoring data.

6. A fabricating method as defined in claim 5, wherein the monitoring process and the milling process are repeated alternately.

7. A method for fabricating a thin film magnetic head including a writing magnetic pole portion composed of a first magnetic film and a second magnetic film formed on said first magnetic film via a gap layer, comprising the steps of:
    fabricating said writing magnetic pole portion on a given wafer,
    swing said writing magnetic pole portion forward and backward around a rotation standard axis parallel to a center line of said writing magnetic pole portion in a direction parallel to a surface of said wafer, holding said writing magnetic pole portion for a given period of time forward and backward from said rotation standard axis in said direction parallel to said surface of said wafer, rotating said writing magnetic pole portion continuously in one direction around said rotation standard axis in said direction parallel to said surface of said wafer, and milling said writing magnetic pole portion during the swing, the holding and the rotation of said writing magnetic pole portion to define the width of said writing magnetic pole portion.

8. A fabricating method as defined in claim 7, wherein the milling process during the swing of said writing magnetic pole portion is performed in an ion-milling process of depth direction where the width of said first magnetic film corresponds to the width of said second magnetic film by utilizing said second magnetic film as a mask.

9. A fabricating method as defined in claim 7, wherein the swing angle is set within 10–135 degrees forward and backward from said rotation standard angle.

10. A fabricating method as defined in claim 7, wherein the milling process during the holding of said writing magnetic pole portion is performed in an ion-milling process of depth direction where the width of said first magnetic film corresponds to the width of said second magnetic film by utilizing said second magnetic film as a mask.

11. A fabricating method as defined in claim 7, wherein the holding angle is set to 90 degrees or below forward and backward from said rotation standard axis.

12. A fabricating method as defined in claim 7, wherein the milling process during the rotation of said writing magnetic pole portion is performed in an ion-milling process of width direction where the width of said writing magnetic pole portion is reduced.

13. A fabricating method as defined in claim 7, further comprising the step of monitoring the width of said writing magnetic pole portion, wherein said writing magnetic pole portion is milled on the monitoring data.

14. A fabricating method as defined in claim 13, wherein the monitoring process and the milling process are repeated alternately.

* * * * *